United States Patent
Tietsworth et al.

(10) Patent No.: US 6,609,431 B1
(45) Date of Patent: Aug. 26, 2003

(54) FLOW MEASURING DEVICE BASED ON PREDETERMINE CLASS OF LIQUID

(75) Inventors: Steven C. Tietsworth, San Diego, CA (US); Lawrence H. Goldstein, Carlsbad, CA (US); Donald J. O'Neil, San Diego, CA (US)

(73) Assignee: Xellogy, Inc., San Diego, CA (US)

( * ) Notice: Subject to any disclaimer, the term of this patent is extended or adjusted under 35 U.S.C. 154(b) by 0 days.

(21) Appl. No.: 09/676,101

(22) Filed: Sep. 29, 2000

(51) Int. Cl.$^7$ .................................................. G01F 1/37
(52) U.S. Cl. ..................................................... 73/861.52
(58) Field of Search ........................ 73/861.42, 861.01, 73/861.53, 861.52, 861.02, 204.12; 222/56, 64, 129.1, 129.3, 145.5, 145.6, 189.06, 190, 413; 137/334, 486, 467.5, 101.21, 487.5, 468, 501, 504

(56) References Cited

U.S. PATENT DOCUMENTS

| | | |
|---|---|---|
| 2,896,656 A | 7/1959 | Allen et al. |
| 3,086,386 A | 4/1963 | Kapff |
| 3,839,914 A | 10/1974 | Modisette et al. ............. 73/438 |
| 3,952,577 A | 4/1976 | Hayes et al. ................... 73/55 |
| 4,118,973 A | 10/1978 | Tucker et al. .................. 73/55 |
| 4,384,472 A | 5/1983 | Tournier ........................ 73/30 |
| 4,425,790 A | 1/1984 | Bice et al. |
| 4,578,990 A | 4/1986 | Abbott et al. .................. 73/55 |
| 4,605,315 A | 8/1986 | Kokoszka et al. |
| 4,627,271 A | 12/1986 | Abbott et al. .................. 73/55 |
| 4,641,535 A | 2/1987 | Malguarnera ............ 73/861.01 |
| 4,644,781 A | 2/1987 | Mon ............................. 73/55 |
| 4,662,219 A | 5/1987 | Nguyen ........................ 73/195 |
| 4,750,351 A | 6/1988 | Ball ............................. 73/55 |
| 4,860,594 A | 8/1989 | Hammond et al. ...... 73/861.42 |
| 4,876,882 A | 10/1989 | Yau .............................. 73/55 |
| 4,876,897 A | 10/1989 | DeCarlo et al. |
| 4,884,441 A | 12/1989 | Lew |
| 4,901,563 A | 2/1990 | Pearson ....................... 73/151 |
| 4,930,343 A | 6/1990 | Johnson ....................... 73/196 |
| 4,961,349 A | 10/1990 | Tanis ....................... 73/861.52 |
| 5,101,668 A | 4/1992 | Lew |

(List continued on next page.)

FOREIGN PATENT DOCUMENTS

| | | |
|---|---|---|
| EP | 0666468 | 2/1995 |
| WO | WO 9004230 | 4/1990 |

OTHER PUBLICATIONS

Schlichting, H., "Boundary layer theory, 7$^{th}$ Edition" McGraw Hill (1979).

Primary Examiner—Hezron Williams
Assistant Examiner—Charlene Dickens
(74) Attorney, Agent, or Firm—Catalyst Law Group (57) ABSTRACT

A flow meter and method for determining the corrected flow rate of a liquid falling into a predetermined class of liquids based on its viscosity and density is disclosed. The flow meter comprises a flow sensor for measuring an uncorrected flow rate of the liquid, a temperature sensor for measuring the temperature of the liquid, and a microprocessor for calculating the corrected flow rate based on the liquids predetermined class and the measured temperature. The flow sensor can include a restriction in the fluid flow path, first and second pressure sensors positioned one on each side of the restriction and a temperature sensor. The first and second pressure sensors measure the drop in fluid pressure created by the restriction and the temperature sensor measures the temperature of the liquid. By basing the corrected flow rate calculation on the predetermined class of the liquid, the calculation becomes a closed form solution that is deterministic providing for quick and accurate corrected flow rate calculation. A flow meter according to the present invention can be used in many applications such as, among others, liquid beverage dispensers and variable speed pumps.

26 Claims, 2 Drawing Sheets

U.S. PATENT DOCUMENTS

| | | |
|---|---|---|
| 5,237,853 A | 8/1993 | Cassaday et al. ............ 73/32 A |
| 5,295,084 A | 3/1994 | Arunachalam et al. ..... 364/558 |
| 5,309,771 A | 5/1994 | Lew et al. |
| 5,359,881 A | 11/1994 | Kalotay et al. ............ 73/54.06 |
| 5,429,001 A | 7/1995 | Kleven |
| 5,461,932 A | 10/1995 | Hall et al. ................ 73/861.61 |
| 5,481,260 A | 1/1996 | Buckler et al. ........ 340/870.09 |
| 5,501,099 A | 3/1996 | Whorff |
| 5,537,860 A | 7/1996 | Haertl ....................... 73/54.14 |
| 5,554,805 A | 9/1996 | Bahrton ....................... 73/202 |
| 5,647,853 A | 7/1997 | Feldmann et al. .......... 604/155 |
| 5,661,232 A | 8/1997 | Van Cleve et al. ......... 73/54.05 |
| 5,808,559 A | 9/1998 | Buckler ................. 340/870.09 |
| 5,861,561 A | 1/1999 | Van Cleve et al. ...... 73/861.52 |
| 5,868,159 A * | 2/1999 | Loan et al. .......... 73/861.52 X |
| 5,877,409 A | 3/1999 | Girling ...................... 73/54.06 |
| 5,931,343 A * | 8/1999 | Topar et al. ................... 222/56 |
| 5,970,801 A | 10/1999 | Ciobanu et al. .......... 73/861.52 |
| 5,982,274 A | 11/1999 | Stelter et al. .......... 340/286.05 |
| 5,999,106 A | 12/1999 | Buckler ................. 340/870.09 |
| 6,029,527 A | 2/2000 | Seitz et al. .............. 73/861.52 |
| 6,067,022 A | 5/2000 | Laswick et al. ............. 340/626 |
| 6,073,483 A | 6/2000 | Nitecki et al. ............. 73/54.05 |
| 6,142,582 A | 11/2000 | Karlsson ................. 303/113.2 |
| 6,195,002 B1 | 2/2001 | Evans, Jr. et al. .......... 340/506 |

\* cited by examiner

FLOW MEASURING DEVICE BASED ON PREDETERMINE CLASS OF LIQUID

FIELD OF THE INVENTION

The present invention relates to flow meters for determining the flow rate of a liquid. More particularly, the present invention relates to flow meters capable of determining the corrected flow rate of a liquid based on a deterministic, closed solution.

BACKGROUND INFORMATION

Flow sensors are generally used to measure an uncorrected flow rate of a liquid flowing in a confined space such as a conduit like a tube or pipe. Among the types of conventional flow sensors are paddle wheel sensors in which a rotatable paddle wheel is inserted into the flow path of a liquid. The flowing liquid causes the paddle wheel to rotate and the flow rate of the liquid is determined based on the speed of rotation of the paddle wheel. Another type of conventional flow sensor is a turbine flow sensor in shich the speed at which a turbine turns in a liquid is used to determine flow rate. However, these particular types of flow sensors are generally not very accurate for measuring low flow rates or flow rates of high viscosity liquids.

Orifice flow sensors have also been used to determine the flow rate of liquid and are better suited for determining low flow rates and the flow rates of viscous liquids. An orifice flow sensor typically comprises an orifice restriction placed in the liquid flow path. The orifice restriction impedes the flow of liquid creating a pressure drop. Pressure sensors can be included for measuring the pressure drop and a flow rate of the liquid can be determined based on the pressure drop, the conduit diameter, and the orifice diameter, as well as certain properties of the liquid such as temperature, viscosity, and density. However, orifice flow sensors do not provide accurate measurements over a wide range of flow rates and liquid properties.

Flow meters have been designed which use discharge coefficients to correct inaccuracies found in conventional flow sensors. Flow meters calculate the corrected flow rate by multiplying the uncorrected flow rate, measured by a conventional flow sensor, by these discharge coefficients to determine a corrected flow rate that more accurately reflects the flow rate of the liquid. These discharge coefficients are typically dependent on liquid flow rate, viscosity and temperature of the liquid, the geometry of the liquid flow path as well as other characteristics specific to the flow meter and its particular application. This detailed information about liquid properties must be know in order to determine the discharge coefficient for a specific flow meter application. Additionally, the discharge coefficient is only accurate for a very specific flow meter configuration and application because it is dependent on the liquid being measured and the meter application properties. Thus, a new discharge coefficient must be calculated if the liquid or application changes, rendering the discharge coefficient relatively useless in a system that must adjust to a variety of liquids with different physical properties.

Corrected flow rate calculations using convention discharge coefficients are determined using recursive calculations. Recursive calculations can be very time consuming and in some situation non-deterministic. Thus, conventional discharge coefficients may not be very useful for correcting inaccurate flow rate measurements in systems in which the corrected flow rate calculations are done repeatedly at very short time intervals.

Accordingly, a need exists for an improved flow meter for accurately measuring the flow rate of a liquid flowing in a conduit. There is also a need for an improved discharge coefficient that is relatively independent of liquid properties and flow meter application characteristics. There is a further need for a discharge coefficient that can be quickly and deterministically calculated.

SUMMARY OF THE INVENTION

These needs and others are satisfied by a flow meter according to the present invention which comprises a flow sensor, a temperature sensor and a microprocessor. The flow meter is configured for determining the flow rate of liquid flowing in a fluid flow path in a confined space. As described below, the conduit diameter is used in calculating the corrected flow rate of the liquid. The liquid is categorized into a predetermined class of liquids based on its viscosity and density with the liquid category being an input to the microprocessor. Each class of liquids comprises liquids having a viscosity and density within a specific range designated for the class.

The flow sensor is configured for measuring an uncorrected flow rate of the liquid flowing in the fluid flow path. The temperature sensor is configured for measuring the temperature of the liquid. The microprocessor determines a corrected flow rate of the liquid based on the predetermined class of the liquid and the measured temperature.

The flow meter of the invention preferably employs an orifice type flow sensor which provides a restriction in the flow path, the restriction creating a second diameter in the flow path, and a differential pressure sensor for measuring the pressure drop created by the restriction. In one embodiment, the differential pressure sensor comprises first and second pressure sensors. The first pressure sensor, positioned on a first side of the restriction, is configured for measuring pre-restriction pressure created in the confined space by the liquid flowing in the fluid flow path on the first side of the restriction. The second pressure sensor, positioned on a second side of the restriction opposite the first side, is configured for measuring post-restriction pressure created in the confided space by the liquid flowing in the fluid flow path on the second side of the restriction. Alternatively, a single differential pressure sensor can be used for measuring the pressure drop.

The microprocessor is connected to the differential pressure sensor (or first and second pressure sensors) and receives the differential pressure (or pre-restriction and post-restriction pressures from the first and second pressure sensors, respectively). The microprocessor determines the flow rate of the liquid flowing in a fluid flow path in a confined space based further on the measured temperature and differential pressure. The confined space includes a first diameter and the restriction creates a second diameter. The first and second diameters dimensions are also used by the microprocessor for determining the flow rate.

Preferably, the first and second pressure sensors comprise silicon-based MEM sensors and the temperature sensor preferably comprises a thermocouple positioned in the fluid flow path. Alternatively, the temperature sensor can comprise a resistive bridge. Additionally, the flow meter can include protective membranes positioned between the first and second pressure sensors and the liquid. While specific types of flow and temperature sensors are mentioned, it can readily be appreciated that any conventional flow or temperature sensor and, in the case of orifice flow sensors, any type of suitable pressure sensor, can be used without departing from the spirit and scope of the invention as set forth in the appended claims.

In one embodiment, the corrected flow rate is determined using the following equation:

$$Q_u = \frac{-a'_1 - \sqrt{(a'_1)^2 - 4a'_0 a'_2}}{2a'_2}$$

where $a_o' = a_0 Q_u$;

$a_1' = a_1 Q_u - 1$;

$a_2' = a_2 Q_u$;

$a_0$, $a_1$ and $a_2$=predetermined coefficients (which are determined empirically as described in the detailed descriptions) based on the temperature and class of liquid; and $Q_u$ is the uncorrected flow rate measured by the flow sensor.

One application of a flow meter according to the present invention is in a beverage dispensing machine for measuring the flow rate of liquid processed by the beverage dispensing machine. In a particularly preferred embodiment of the invention, the flow meter is used in a dispensing machine that mixes a flavored syrup concentrate and water, for example, carbonated water, to obtain the beverage. In this kind of beverage dispensing machine, the syrup is allowed to flow freely and, based on its flow rate, the flow rate of the water is adjusted to provide a a beverage when dispensed having the desired ratio of syrup to water. The flow meter can include or be combined with a valve for regulating the flow rate of the water based on the determined flow rate of the syrup. In a particularly preferred embodiment, a second flow meter of the present invention is used to measure the flow of the water as well in order to premit accurate adjustment of the valve used to adjust its flow relative to the freely flowing syrup. Additionally, the flow meter can be configured for controlling the amount of liquid dispensed by the syrup dispenser based on the determined flow rate.

The flow meter can be used in various other applications including with a variable speed pump to measure and control the flow rate of liquid pumped by the pump. The flow meter is configured to make periodic flow rate calculations and because it has no mechanical inertia, it is particularly suited for measuring the non-uniform flows generally found in variable speed pumps. The flow meter can include a wireless communication system for transmitting the determined flow rate to a central control center or for receiving control signals from the central control center for controlling operation of the flow sensor.

In a liquid beverage dispenser application in which the beverage dispenser is configured to mix syrup and water to produce a liquid beverage, the flow meter can be configured for determining the flow rate of syrup flowing in a syrup flow path in a syrup dispensing conduit and adjusting the flow rate of water based on the flow rate of syrup to provide a beverage having the desired ratio of syrup to water. In this application, the syrup falls into a predetermined class of syrups based on the viscosity and density of the syrup. It can be readily appreciated that flow meters according to the present invention can also be used in beverage dispenser that mix more than two liquids as long as the mixing ratio is defined.

The flow meter comprises an orifice restriction in the conduit, first and second pressure sensors, a temperature sensor, a microprocessor and a valve in the water flow path. The orifice restriction has an orifice diameter that is smaller than the conduit diameter The first pressure sensor, positioned on a first side of the orifice restriction, is configured for measuring pre-restriction pressure created in the conduit by the syrup flowing in the syrup flow path on the first side of the orifice restriction. The second pressure sensor, positioned on a second side of the orifice restriction, measures the post-restriction pressure created in the conduit by syrup flowing in the syrup flow path on the second side of the orifice restriction. The temperature sensor measures the temperature of the syrup.

The microprocessor is connected to the temperature sensor, and the first and second pressure sensors for receiving the measured temperature, and the pre-restriction and post-restriction pressures from the temperature sensor, first pressure sensor and second pressure sensor, respectively. The valve is connected to the microprocessor for regulating the flow rate of the water. The microprocessor is configured to actuate the value to adjust the flow rate of water based on the determined flow rate of the syrup.

Further objects, features and advantages of the present invention will become apparent from the following description and drawings.

DETAILED DESCRIPTION OF A PREFERRED EMBODIMENT OF THE INVENTION

In accordance with the present invention, a flow meter is described that provides distinct advantages when compared to those of the prior art. The invention can best be understood with reference to the accompanying drawing figures.

Figure 1:
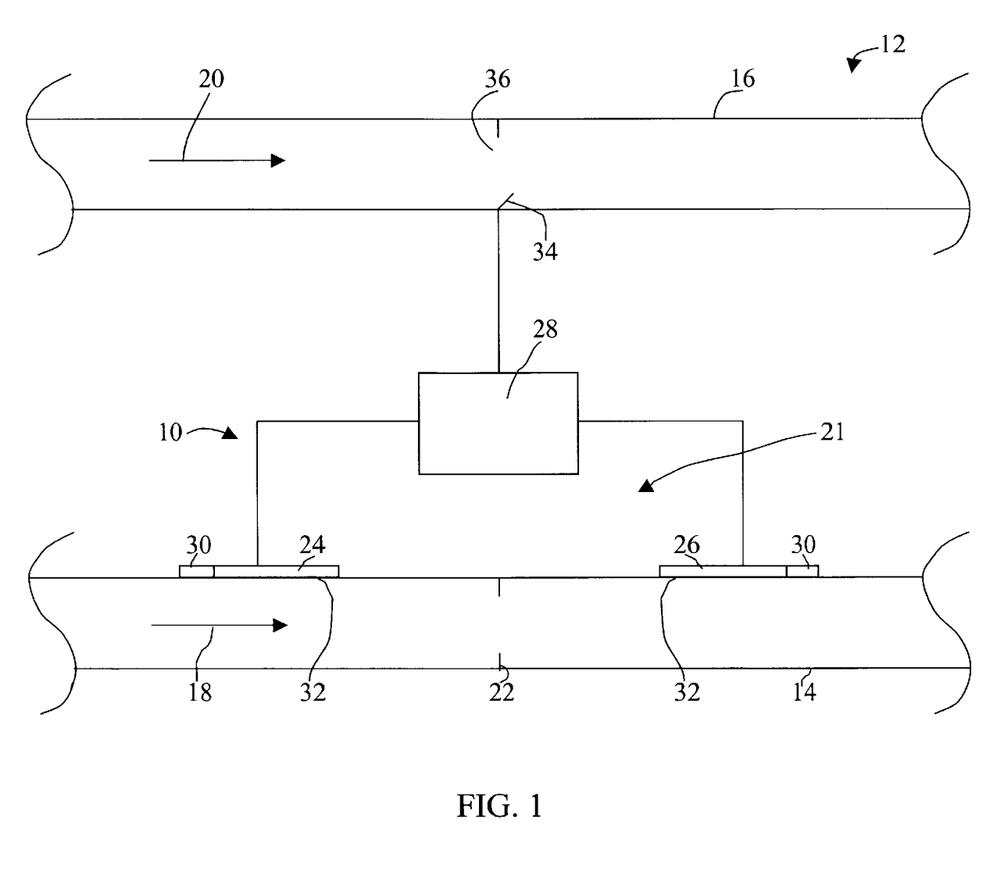
FIG. 1 is block diagram of a flow meter according to the present invention installed in a liquid beverage dispensing machine.

Referring now to the drawings, a flow meter according to the present invention is generally designated by reference numeral 10 in FIG. 1. The flow meter 10 is shown, for purposes of illustrating its manner of operation, installed in a liquid beverage dispensing machine 12, details of the construction of which are not shown but are well known in the art. The liquid beverage dispensing machine 12 includes a first conduit 14 for dispensing liquid syrup and a second conduit 16 for dispensing water. The syrup flows freely through the first conduit 14 in the direction of arrow 18 and the water flows through the second conduit 16 in the direction of arrow 20, its flow rate being controlled by a valve 34. Preferably, the first and second conduits 14, 16 are circular in cross-section, however, any suitably shaped conduit may be used. In operation, the syrup and water are mixed together and dispensed through a nozzle (not shown) having a valve (not shown) for controlling dispensing of the mixed syrup/water beverage.

The flow meter 10 includes a flow sensor 21 and a microprocessor 28. In the embodiment shown in FIG. 1, the flow sensor 21 comprises an orifice flow sensor. While an orifice flow sensor is shown in FIG. 1, it is understood that, depending upon the system in which flow rate is being determined, any suitable flow sensor, such as a flow nozzle sensor, Venturi flow sensor, paddle wheel sensor, turbine flow sensor, etc., could be used in a flow meter 10 according to the present invention without departing from the spirit and scope of the invention as recited in the appended claims.

The flow sensor 21 shown in FIG. 1 includes a restriction 22 in the first conduit 14, a first pressure sensor 24 on the upstream side of the restriction 22, and a second pressure sensor 26 on the downstream side of the restriction 22. Preferably, the first and second pressure sensors 24, 26 comprise micro-electromechanical (MEM) sensors, however any suitable pressure sensor can be used.

The flow meter 10 also comprises a temperature sensor 30. A protective membrane 32 can be included between the pressure and temperature sensors 24, 26, and 30 and the syrup for protecting the sensors 24, 26, 30. In the embodiment shown in FIG. 1, the temperature sensor 30 is integrated into the first and second pressure sensors 24, 26. The temperature sensor 30 can comprise a resistive bridge or any other suitable temperature sensor, thermocouple or device.

The microprocessor 28 is electrically connected to the first and second pressure sensors 24, 26 and the temperature sensor 30. The first pressure sensor 24 is configured for measuring pressure created by the syrup flowing on the upstream side of the restriction 22 and the second pressure sensor 26 is configured for measuring the pressure created by the syrup flowing on the downstream side of the restriction 22. The temperature sensor 30 measures the temperature of the syrup and sends the measured temperature to the microprocessor 28.

In one embodiment, the microprocessor 28 comprises an Amtel AVR AT90S8535 microprocessor. The AT90S8535 includes on-chip EEPROM that can be used for non-volatile storage of information, such as flow sensor parameters like the diameters of the restriction and first conduit and as well as various corrected flow rate calculation parameters such as syrup predetermined class information, which is discussed in more detail below. However, any suitable microprocessor or computer can be used without departing from the spirit and scope of the invention.

In operation, the restriction 22 causes a drop in pressure such that the pre-restriction pressure (the pressure measured by the first pressure sensor 24) is larger than the post-restriction pressure (the pressure measured by the second pressure sensor 26). The first pressure sensor 24 measures and sends the pre-restriction pressure to the microprocessor 28 and the second pressure sensor 26 measures and sends the post-restriction pressure to the microprocessor 28. The microprocessor 28 calculates the drop in pressure created by the restriction 22 by subtracting the post-restriction pressure from the pre-restriction pressure. The drop in pressure is used in determining the flow rate of the syrup as explained more fully below.

The syrup used in the beverage dispensing machine 12 is categorized into a predetermined class of liquids based on its viscosity and density. For example, a syrup having a high sugar content, such as the syrup used for making a cola beverage or root beer, will have a relatively high viscosity and density compared to the water with which it will be mixed and will be categorized into a predetermined class of high viscosity and density liquids. Conversely, a syrup having a low sugar content, such as the syrup used for making a diet soda, will have a relatively low viscosity and density and will be categorized into a predetermined class of low viscosity and density liquids. Each class will correspond to liquids having a viscosity and density within a predetermined range of viscosities and densities. The microprocessor 28 calculates the corrected flow rate of the syrup based in part on the predetermined class of the syrup being measured.

The microprocessor 28 includes a software algorithm for calculating the corrected flow rate of the syrup flowing in the first conduit 14 based on the predetermined class of the syrup, the temperature of the syrup as measured by the temperature sensor 30 and the drop in pressure calculated from the pre-restriction pressure and post-restriction pressure as measured by the first and second pressure sensors 24, 26, respectively.

The uncorrected flow rate $Q_u$ for a conventional orifice flow sensor is generally calculated as follows:

$$Q_u = \frac{d^2}{4\rho(T)^{0.5}} \sqrt{\frac{2\Delta\rho}{1-\beta^4}} \quad (1)$$

where:

$\Delta\rho$ is the drop in pressure across the restriction;

$$\beta = \frac{d}{D};$$

d is the diameter of the restriction;

D is the diameter of the first conduit;

$\rho$ is the density of the syrup; and

T is the temperature of the syrup.

In order to correct for the inaccuracies in the uncorrected flow rate described above, $Q_u$ is sometimes multiplied by a discharge coefficient $C_d$. The discharge coefficient $C_d$ can be based on, among other things, flow rate, the viscosity and temperature of the liquid being measured, and the diameters of the conduit and restriction. However, calculating a corrected flow rate based on a conventional discharge coefficient $C_d$ is a recursive calculation that may take a long time or may even be non-deterministic.

The present invention involves using a novel discharge coefficient $C_{dnew}$ that is based on the predetermined class of the syrup being measured. The novel discharge coefficient $C_{dnew}$ is calculated as a function of the predetermined class and temperature of the syrup being measured and is a deterministic calculation. The calculation is also relatively simple and thus can be completed very quickly so that the corrected flow rate can be determined very quickly even in systems in which the corrected flow rate must be calculated repeatedly at short time intervals.

A discharge coefficient $C_{dnew}$ according to the present invention is calculated as follows:

$$C_{dnew} = a_0(S,T) + a_1(S,T)Q_c = a_2(S,T)Q_c^2 \quad (2)$$

where $a_0$, $a_1$ and $a_2$ are predetermined coefficients based on temperature T and the predetermined class of the syrup S. The predetermined coefficients, $a_0$, $a_1$ and $a_2$, are determined empirically and stored for each particular flow configuration but can be used for a range of syrups. Alternatively, look up tables can be created such that the corrected flow rate can be determined by a table look up based on the measured temperature and drop in pressure.

Using the discharge coefficient from equation (2), a closed form solution for flow rate can be easily calculated. This calculation can be done in real time using the pressure drop across the restriction 22, as calculated by the microprocessor 28, the predetermined class of the syrup, and the temperature of the syrup, as measured by the temperature sensor 30. The corrected flow rate $Q_c$ is calculated as follows:

$$Q_u = \frac{-a'_1 - \sqrt{(a'_1)^2 - 4a'_0 a'_2}}{2a'_2} \quad (3)$$

where $a_o' = a_0 Q_u$;
$a_1' = a_1 Q_u - 1$; and
$a_2' = a_2 Q_u$.

Equation (3) provides very accurate flow rate correction in a closed form solution that greatly simplifies the processing of flow rate data.

In operation, the flow meter 10 data acquisition process is initiated by taking a voltage sample from the pressure and temperature sensors 24, 26, 30. Readings from the pressure sensors 24, 26 are combined into a single differential voltage reading representing an instantaneous pressure drop across the orifice 22. A filter can be added to reduce noise in the sampled pressure data. Filtering of noise can be implemented in a variety of ways, for example, an averaging filter can be used. The filter is configured to take a predetermined number of data samples and average the data samples to obtain one output sample for every predetermined number of data samples taken. While an averaging filter is described, it can be appreciated that other suitable filters, such as a median filter that takes a predetermined number of samples and selects the median value, can be used.

Data sampling and acquisition is repeated to obtain a set of data samples, allowing for filtering as described above. A typical sampling rate according to the present invention is 500 samples per second and with filtering done every 10 samples. Sampling and filtering rates are specifically tailored to the particular noise characteristics of the pressure sensors 24, 26 used in the flow meter 10 and the desired range of flow rates to be measured.

The filtered pressure data comprises a voltage signal proportional to the pressure drop across the orifice 22. For convention pressure sensors 24, 26, there is a scaling factor that relates the voltage signal to a pressure reading. Most conventional pressure sensors have a linear voltage to pressure relationship (i.e. the pressure equals the voltage multiplied by some constant value) however, any known relationship between voltage and pressure can be implemented providing the conversion factor can be described in an analytical way. The conversion factor is stored in the microprocessor 28 and is multiplied by the voltage signal to obtain a pressure differential reading at one sample point in time. A temperature reading is calculated from the temperature voltage sample in a similar manner.

An input is provided which identifies the class of liquid being measured. This input can be provided either through hardware via switches, predefined logic states in a hardware device, or by software via a parameter stored in the microprocessor 28. The class information identifies liquid class parameters such as density and viscosity as well as any other class specific information that is required to determine the flow rate of the liquid. The class information is used to provide correction factors, which are determined empirically as described in more detail below.

The flow rate of a liquid is determined using the pressure and temperature readings and correction factors as described above. Each calculated flow rate represents an instantaneous flow rate over a period in time. For example, with a raw sample rate of 500 samples per second and a filtering rate of 10 samples, the calculated flow rate represents the flow rate of the liquid over a 20 millisecond time period. The flow volume over this period of time is determined by multiplying the calculated flow rate by time period between samples. For example, at a calculated flow rate of 2 ounces per second with a 20 millisecond processed sample period, the flow volume over that time interval is 0.04 ounces. Volume over an arbitrary period of time can be determined by summing flow rate measurements over the time period of interest and multiplying by the time elapsed.

The calculated flow rate can be further processed using either a linear or nonlinear filtering routine to improve flow measurements. For example, a nonlinear filter can be applied to truncate any flow measurement below a cutoff value. This can be used to correct for noise generated by mathematical operations in calculating flow, to correct for fixed offsets in one or more of the pressure sensors 24, 26, or for other corrections as required to improve processing resolution or accuracy. The final corrected flow rate can be output via either a serial or parallel port (not shown) on the microprocessor 28 for use in a closed loop control system, for data logging, testing, analysis, or any other purpose related to the flow meter application.

As mentioned above, the discharge coefficient parameters are a function of flow rate, temperature, and fluid class and they need to be determined for the range of values a specific flow meter will be used with. One way of empirically determining the predetermined coefficients, $a_0$, $a_1$ and $a_2$ is by using the following process.

A liquid under test, which is one sample of a particular liquid of a predetermined class being tested, is pumped at a constant rate through the flow meter 10, for example by a gear pump driven system. A gear pump driven system provides an adjustable means of pumping the liquid, at a programmed flow rate, through the system while maintaining a constant flow rate for the duration of the flow cycle. In addition, the duration of the flow cycle can be controlled by turning the gear pump on and off electronically at precise time intervals. This provides a precise means for controlling both the flow rate and the total volume of liquid delivered through the flow meter 10 during a test cycle. While a gear pump driven system is specifically described, it can be appreciated that other suitable pump systems can be used during a test cycle without departing from the spirit or scope of the invention.

The fluid is pumped through the flow meter 10 and the flow meter 10 measures the flow rate of the liquid at intervals as described above. The flow rate and flow volume data is processed, on a sample by sample basis, to incorporate the density and temperature inputs for the liquid being tested. The flow rate measured by the flow meter 10 is multiplied by the duration of the flow cycle to calculate a measured flow volume.

The fluid pumped through the flow meter 10 is collected in a storage container. After completion of the test cycle, the entire mass of the liquid that was pumped through the flow meter 10 is weighed on a precision scale and the mass is recorded. The measured mass is converted to volume by dividing by the liquid density. This measured volume is plotted on a graph with the measured flow volume calculated by the flow meter 10. This process is repeated over a range of flow rates and temperatures to produce a graph plotting actual flow volume (as measured by the collected liquid) and the liquid volume measured by the flow meter 10. A conventional curve fitting routine, such as a means-square-fit algorithm, can be used to empirically determine the predetermined coefficients, $a_0$, $a_1$ and $a_2$.

As shown in FIG. 1, a flow meter 10 according to the present invention can be used in a liquid beverage dispensing machine 12 such as a soda dispenser. As described above, a liquid beverage dispensing machine 12 can include first and second conduits 14, 16 for carrying syrup and water, respectively. The syrup and water are mixed to form a beverage such as soda, which is dispensed through a nozzle (not shown) in the beverage dispensing machine 12. The ratio of syrup to water must be carefully controlled in this type of beverage dispensing machine 12 in order to maintain the quality of the dispensed soda.

One application of a flow meter 10 according to the present invention is for measuring the flow rate and volume of the syrup and using the measured syrup flow rate, adjusting to the flow rate of the water to maintain the proper ratio. In this type of beverage dispensing machine 12, an adjustable valve 34 can be placed in the water flow path in the second conduit 16. The microprocessor 28 is connected to the valve 34 for adjusting the valve 34 to alter the flow rate of the water in conduit 16 based on the calculated flow rate of the syrup in the first conduit 14.

Typically, in this type of application, the syrup is allowed to flow freely through the first conduit 14. The valve 34 includes an aperture 36 that is adjustable to control the flow rate of the water based on the syrup flow rate. As disclosed above, the microprocessor 28 calculates a corrected flow rate of the syrup. The microprocessor 28 can be programmed to calculate the appropriate flow rate of water based on the syrup flow rate for the various types of soda beverage dispensed by the beverage dispenser 12. Based on the calculated preferred water flow rate, the microprocessor 28 actuates the valve 34 opening or closing the aperture 36 to adjust the water flow rate, preferably measured by a second flow meter of the invention not shown, accordingly. Conversely, it can readily be appreciated the first conduit 14 can include a valve and the flow rate of the syrup can be adjusted based on the flow rate of the water.

Figure 2:
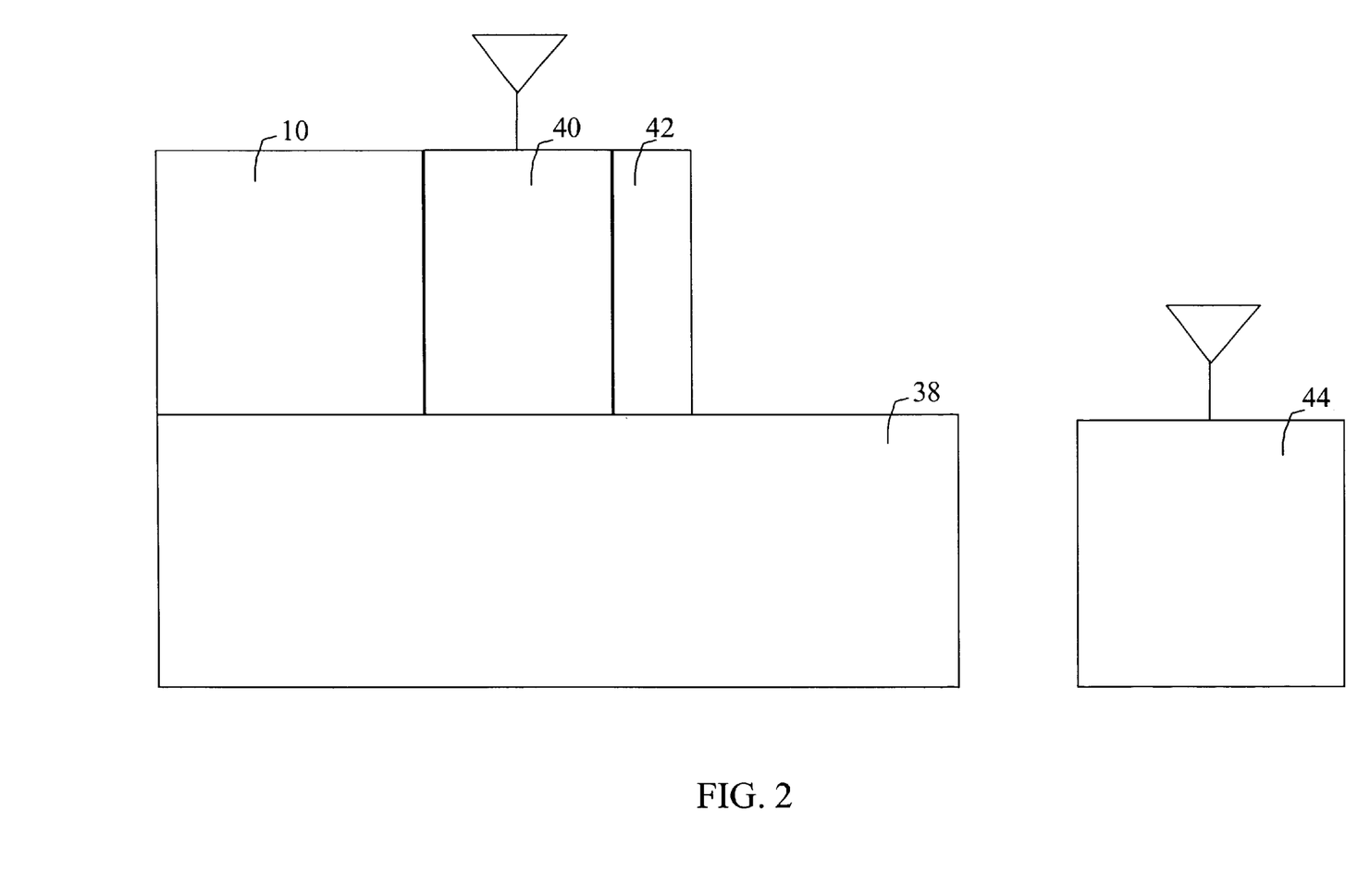
FIG. 2 is a block diagram of a flow meter according to the present invention installed in a variable speed pump with a wireless communication system.

Another possible application of a flow meter 10 according to the present invention is in a variable speed pump 38 as shown in FIG. 2. In this application, the flow meter 10 is configured to measure the flow rate of liquid being pumped by the pump. Other applications of a flow meter 10 according to the present invention not discussed herein are considered within the spirit and scope of the invention.

A flow meter 10 according to the present invention can also include a wireless communication system 40, also shown in FIG. 2. The wireless communication system 40 includes a transceiver 42 for sending and receiving information to and from a central control center 44. The wireless communication system 40 can be used to send flow rate information calculated by the flow meter 10 to the central control center 44.

The wireless communication system 40 can also be used for controlling operation of the flow meter 10 or the system (i.e. variable speed pump 38, beverage dispensing machine 12, etc.) in which the flow meter 10 is operating. The flow meter 10 can be remotely programmed using the wireless communication system 40. For example, system information, such as predetermined class information, can be sent from the central control center 44 to the flow meter 10. The central control center 44 can also send control signals to the flow meter 10 instructing the flow meter 10, for example, to turn on or off. The control signals can also be used to instruct the microprocessor 28 to turn the system (i.e. variable speed pump 38, beverage dispensing machine 12, etc.) on or off or control various other aspects of the system through the microprocessor 28. While the wireless communication system 40 is only shown in FIG. 2, it can also be used in the embodiment shown in FIG. 1 or in other applications of a flow meter 10 according to the present invention.

While operation of the flow meter of the invention has been exemplified in a device for dispensing beverages, it will be apparent to those skilled in the art that it can be used in other environments as well. For example, it can be used to accurately measure the flow rat in pipelines and in conduits moving liquids in oil refineries and chemical processing plants. Accordingly, it also will be apparent to those skilled in the art that modifications may be made without departing from the spirit and scope of the invention. Accordingly, it is not intended that the invention be limited except as may be necessary in view of the appended claims.

We claim:

1. A flow meter for determining a flow rate of liquid flowing in a fluid flow path in a confined space having a first diameter, the liquid falling into a predetermined class of liquids based on viscosity and density of the liquid, the flow meter comprising:

a flow sensor for measuring an uncorrected flow rate of the liquid flowing in the fluid flow path;

a temperature sensor for measuring the temperature of the liquid; and a microprocessor means configured for determining a corrected flow rate of the liquid flowing in a fluid flow path in a confined space based on the predetermined class of the liquid and the measured temperature.

2. The flow meter of claim 1 further comprising:

a restriction in the flow path, the restriction creating a second diameter;

a differential pressure sensor for determining a differential pressure measured as a drop in pressure created by the restriction in the flow path wherein the microprocessor is connected to the differential pressure sensor for receiving the differential pressure and the microprocessor is configured for determining the flow rate of the liquid flowing in a fluid flow path in a confined space based further on the measured differential pressure.

3. The flow meter of claim 2 wherein the differential pressure sensor comprises:

a first pressure sensor on a first side of the restriction, the first pressure sensor being configured for measuring pre-restriction pressure created in the confided space by the liquid flowing in the fluid flow path on the first side of the restriction a second pressure sensor on a second side of the restriction opposite the first side, the second pressure sensor being configured for measuring post-restriction pressure created in the confided space by the liquid flowing in the fluid flow path on the second side of the restriction;

wherein the differential pressure is the difference between the pre-restriction pressure and the post-restriction pressure.

4. The flow meter of claim 2 wherein the confined space includes a first diameter, the restriction creates a second diameter and the flow rate is further determined based on the first and second diameters.

5. The flow meter of claim 3 wherein the first and second pressure sensors comprise silicon-based MEM sensors.

6. The flow meter of claim 2 further comprising a protective membrane positioned between the differential pressure sensor and the liquid.

7. The flow meter of claim 1 wherein the temperature sensor comprises a thermocouple positioned in the fluid flow path.

8. The flow meter of claim 1 wherein the temperature sensor comprises a resistive bridge.

9. The flow meter of claim 1 wherein the corrected flow rate is determined using the following equation:

$$\frac{-a_1' - \sqrt{(a_1')^2 - 4a_0'a_2'}}{2a_2'}$$

where
$a_0' = a_0 Q_u$;
$a_1' = a_1 Q_u - 1$;
$a_2' = a_2 Q_u$;
$a_0$, $a_1$ and $a_2$ = predetermined coefficients based on the temperature and class of liquid; and
$Q_u$ is the uncorrected flow rate measured by the flow sensor.

10. The flow meter of claim 1 further configured for use in a beverage dispensing machine for measuring the flow rate of liquid dispensed by the beverage dispensing machine.

11. The flow meter of claim 10 wherein the liquid is syrup which is mixed with water by the beverage dispensing machine to produce a beverage, the flow meter further including a valve for regulating the flow rate of the water based on the determined flow rate of the syrup.

12. The flow meter of claim 1 wherein the flow sensor is configured for use in a liquid dispenser, the flow meter further including a valve for controlling the amount of liquid dispensed by the liquid dispenser based on the determined flow rate.

13. The flow meter of claim 1 wherein the flow meter is configured for use in a variable speed pump for determining the flow rate of liquid pumped by the pump.

14. The flow meter of claim 1 further comprising a wireless communication system for transmitting the determined flow rate to a central control center.

15. The flow meter of claim 14 wherein the wireless communication system is further configured for receiving control signals from the central control center for controlling operation of the flow sensor.

16. A flow sensor for use in a liquid beverage dispenser configured to mix syrup and water to produce a liquid beverage, the flow sensor being configured for determining the flow rate of syrup flowing in a syrup flow path in a syrup dispensing conduit having a diameter and adjusting the flow rate of water based on the flow rate of syrup, the syrup falling into a predetermined class of syrups based on the viscosity of the syrup, the flow sensor comprising:

an orifice restriction in the conduit, the orifice restriction having an orifice diameter;
a differential pressure sensor for measuring the differential pressure created by the orifice restriction;
a temperature sensor for measuring the temperature of the syrup;
a microprocessor means connected to the temperature sensor and the differential pressure sensor for receiving the measured temperature and the differential pressure, for determining a flow rate of the syrup based on the measured temperature, differential pressure and predetermined class of the syrup; and
a valve connected to the microprocessor for regulating the flow rate of the water, wherein the microprocessor is configured to actuate the value to adjust the flow rate of water based on the determined flow rate of the syrup.

17. The flow meter of claim 16 wherein the differential pressure sensor comprises:

a first pressure sensor on a first side of the orifice restriction, the first pressure sensor being configured for measuring pre-restriction pressure created in the conduit by the syrup flowing in the syrup flow path on the first side of the orifice restriction; and a second pressure sensor on a second side of the orifice restriction, the second pressure sensor being configured for measuring post-restriction pressure created in the conduit by syrup flowing in the syrup flow path on the second side of the orifice restriction;
wherein the differential pressure is the difference between the pre-restriction pressure and the post-restriction pressure.

18. The flow meter of claim 17 wherein the first and second pressure sensors comprise silicon-based MEM sensors.

19. The flow meter of claim 16 further comprising a protective membrane positioned between the differential pressure sensor and the liquid.

20. The flow meter of claim 16 wherein the corrected flow rate is determined using the following equation:

$$\frac{-a_1' - \sqrt{(a_1')^2 - 4a_0'a_2'}}{2a_2'}$$

where
$a_0' = a_0 Q_u$;
$a_1' = a_1 Q_u - 1$;
$a_2' = a_2 Q_u$;
$a_0$, $a_1$ and $a_2$ = predetermined coefficients based on the temperature and class of liquid; and
$Q_u$ is the uncorrected flow rate measured by the flow sensor.

21. The flow meter of claim 16 further comprising a wireless communication system for transmitting the determined flow rate to a central control center.

22. The flow meter of claim 21 wherein the wireless communication system is further configured for receiving control signals from the central control center for controlling operation of the flow sensor.

23. A method for determining a flow rate of a liquid flowing in a fluid flow path in a confined space having a first diameter with an orifice in the confined space having a second diameter, the liquid falling into a predetermined class of liquids based on viscosity and density of the liquid, the method comprising the steps of:

a) measuring a pressure differential created by the orifice;
b) measuring a temperature of the liquid; and
c) calculating the flow rate based on the measured pressure differential, measured temperature and predetermined class of liquid.

24. The method of claim 23 wherein the step of measuring a pressure differential further comprises;

measuring a pre-restriction pressure created by the liquid in the confined space on a first side of the orifice;
measuring a post-restriction pressure created by the liquid in the confined space on a second side of the orifice;
calculating the difference between the pre-restriction pressure and the post-restriction pressure.

25. The method of claim 23 further comprising the steps of:

periodically repeating steps a)–c) at predetermined time intervals.

26. The method of claim 25 further comprising the steps of:

multiplying the calculated flow rate by the predetermined time interval to determine a volume of liquid flowing during the predetermined time interval.

* * * * *

UNITED STATES PATENT AND TRADEMARK OFFICE
CERTIFICATE OF CORRECTION

PATENT NO. : 6,609,431 B1
DATED : August 26, 2003
INVENTOR(S) : Steven C. Tietsworth, Lawrence H. Goldstein and Donald J. O'Neil It is certified that error appears in the above-identified patent and that said Letters Patent is hereby corrected as shown below:

<u>Title page,</u>
Item [73], Assignee, "Xellogy, Inc." should read -- Xsilogy, Inc. --

Signed and Sealed this

Fourteenth Day of October, 2003

JAMES E. ROGAN
*Director of the United States Patent and Trademark Office*